(12) United States Patent (10) Patent No.: US 8,424,014 B2
Auernhammer et al. (45) Date of Patent: Apr. 16, 2013

(54) METHOD FOR PUSHING WORK REQUEST-ASSOCIATED CONTEXTS INTO AN IO DEVICE

(75) Inventors: Florian Alexander Auernhammer, Adliswil (CH); Patricia Maria Sagmeister, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 12/394,681

(22) Filed: Feb. 27, 2009

(65) Prior Publication Data

US 2010/0223624 A1 Sep. 2, 2010

(51) Int. Cl.
*G06F 9/46* (2006.01)
(52) U.S. Cl.
USPC .......................................... 718/108; 712/228
(58) Field of Classification Search .................. 718/108; 712/228
See application file for complete search history.

(56) References Cited

U.S. PATENT DOCUMENTS

| | | | | |
|---|---|---|---|---|
| 5,428,779 A | * | 6/1995 | Allegrucci et al. | 718/108 |
| 5,860,104 A | * | 1/1999 | Witt et al. | 711/137 |
| 6,262,987 B1 | * | 7/2001 | Mogul | 370/400 |
| 6,487,640 B1 | * | 11/2002 | Lipasti | 711/140 |
| 7,089,367 B1 | * | 8/2006 | Koker et al. | 711/137 |
| 2007/0168641 A1 | * | 7/2007 | Hummel et al. | 711/206 |
| 2007/0168644 A1 | * | 7/2007 | Hummel et al. | 711/207 |
| 2007/0180156 A1 | * | 8/2007 | Irish et al. | 710/5 |
| 2008/0147925 A1 | * | 6/2008 | Brahmaroutu | 710/62 |
| 2008/0256303 A1 | * | 10/2008 | Croxford et al. | 711/144 |

OTHER PUBLICATIONS

Raj et al., High Performance and Scalable I/O Virtualization via Self-Virtualized Devices, Jun. 25-27, 2007, ACM, HPDC'07, pp. 179-188.*
Sayantan Sur, et al., "Can Memory-Less Network Adapters Benefit Next-Generation InfiniBand Systems?", Network-Based Computing Laboratory, Department of Computer Science and Engineering, The Ohio State University @cse.ohio-state.edu., Aug. 17-19, 2005.

* cited by examiner

*Primary Examiner* — Jennifer To
*Assistant Examiner* — Abu Z Ghaffari
(74) *Attorney, Agent, or Firm* — Scully, Scott, Murphy & Presser, P.C.; Daniel P. Morris, Esq.

(57) ABSTRACT

A system and method employing the system for pushing work request associated contexts into a computer device includes issuing a request to a device in a computer system. Context data is fetched from a data storage device for the device. Context is determined for specified data requests, and context misses in the device are predicted. The system and method then initiates a context push and pushes the context into the device using a controller when a context miss is detected. Thereby, reducing the context miss latency time or delay in retrieving context data.

18 Claims, 3 Drawing Sheets

METHOD FOR PUSHING WORK REQUEST-ASSOCIATED CONTEXTS INTO AN IO DEVICE

FIELD OF THE INVENTION

The present invention relates to a system and method for providing virtual interfaces using queuing in a computer system, and more particularly, a system and method for providing virtual interfaces using queuing in a computer system using virtual interface context miss prediction for an input/output (IO) device for reducing context data retrieval latency.

BACKGROUND OF THE INVENTION

In typical computer systems, input/output (IO) devices, especially networking devices, use contexts or context data in order to enable working on requests from different users. Since there may be a very large number of contexts supported by a device, only a small number is actually cached in the device, the others remain in backing store and are only fetched when needed.

Known computer systems use virtualization support in parts of the system, for example, the processing unit (PU), the IO controller (IOC), and external switches and devices. IO devices use context data within the virtualized device to provide virtualization support. Each interface to a device, and therefore the device-virtualization, is enabled by storing the information needed for each interface in separate contexts. A mechanism that can be used without special support in the processor, and which relies only on the system supervisor or hypervisor, is referred to herein as software (SW) virtualization. Separation of different virtual interfaces from each other is achieved using virtual address support in a memory management unit. The IO device provides a number of virtual interfaces on contiguous pages in a real address space, one virtual interface having at least the size of the smallest page size of the system. The supervisor or hypervisor can map each interface into the virtual address space of a user. As many virtual interfaces as needed may be mapped into the virtual address space of the same user. The virtual interface can not only provide a doorbell-mechanism/a doorbell register, but may also allow access to configuration registers which may be accessed by the user.

In a single-root host-virtualized system, a device can offer a number of virtual functions. The virtualized system is similar to the system used for software-virtualization, but has hardware-support both in the IO controller and the IO device. Therefore, a device can offer a number of interfaces to the user in the form of virtual functions. A virtual function is derived from a physical function, that is, virtual functions provide the same functionality as the physical function. However, virtual functions have their own configuration in the IO controller and the IO device and are therefore protected from the other virtual functions of the same type.

Another example of virtualization is multi-root virtualization. Using this technique, different peripheral component interconnect (PCI) root-complexes can use the same IO device. Multi-root virtualization is implemented using mechanisms in the switch(es) connecting the IO devices with the root complexes and the IO device itself. It is therefore invisible to the root complexes.

Handling context data in a device is important, especially if the contexts are relatively large, for example, several cache lines. Without the appropriate context data, the IO device cannot start the real processing task. Therefore, context misses, resulting in a context-miss latency, cannot be hidden by other processing tasks for the request. Context cache miss penalties in terms of latency can be as high as the packet latency itself. Increased numbers of cores and users accessing the device result in an increasing probability of context misses in the device. The latency impact will most probably increase in multi-root environments which frequently feature more than one switch between the root complex and the device. Furthermore, context cache misses are difficult to handle in hardware and necessitate queues in the IO device in order to avoid creating back pressure into the processor.

Virtualization and its scalability is achieved using context data, and support for every virtual function/interface necessitates a separate context. In many cases, the number of contexts or context data is too large to fit into the cache of an IO device. Context data not in use is stored in memory attached to the IO device or in the system main memory, the so-called backing store. The use of system memory causes the above described long fetch-latencies (delays) for context data which cannot be hidden efficiently. Further, attaching memory to the device is expensive, and can be cost prohibitive.

Context misses can have a high impact on the cumulative delay times in a system, for example in network packet processing. IO device context data is typically stored in main memory, as opposed to data used for processing which may reside in a system cache prior to being requested by the device. Thus, context data is typically subject to long memory latency (or time delays). As a result, context misses may inflict the longest latency during packet processing in the system.

It would therefore be desirable to resolve context-misses as fast as possible. It is further desirable to facilitate operation in an IO device by sufficiently delaying a doorbell until the context-miss is resolved.

SUMMARY OF THE INVENTION

In an aspect of the present invention, a method for pushing work request associated contexts into an IO device using a computer system including computer readable medium having a program recorded thereon and being executable by a processing unit, comprises: issuing a request to an IO device, fetching context data from a data storage device/memory for the IO device; determining context of specified requests; predicting context misses of the IO device in the processing unit; initiating a context push; and pushing the context into the IO device using an IO controller when a context miss is detected to reduce the context miss latency time.

In a related aspect, the step of initiating a context push includes a software program embodied on computer readable medium interacting with the device for initiating the context push. In another related aspect, the step of initiating the context push includes a mechanism in an IO controller for initiating the context push, and the mechanism initiates the context push in response to information provided by the IO device. In a farther aspect, fetching the context data includes using a base address of the context data. Fetching the context data may also include the size of the context. Fetching the context data may farther include a recently derived context number. In another aspect, the controller is an IO controller/bus root complex interfacing a virtualized IO device. The method may further include determining the size of a virtual interface. The method may farther include determining a base address for virtual interfaces of the device, and matching context data of the device using a context base address. The method may farther comprise presenting a plurality of interfaces to a user. The method may farther comprise providing a memory management unit supporting virtual addresses. In another related aspect, a memory management unit is used to map at least one interface into the virtual address space of at least one user, the device is an IO device, and the IO device provides at least one virtual function in a bus root complex. The IO device may present a plurality of interfaces to a user of a virtual function.

In another aspect of the invention, a system for pushing work request associated contexts into a computer device includes a computer system including a computer readable medium having a program recorded thereon which is executable by a processor in the computer system. A data storage device in the computer system provides context data for an IO device. The processing unit predicts context misses in the device. The processing unit initiates a context push using the IO controller of the computer system. The IO controller therefore determines the context of the request and pushes the context into the computer device when a context miss is detected to reduce the context miss latency time.

In a related aspect, a mechanism in an IO controller initiates the context push, and the mechanism initiates the context push in response to information provided by the IO device. The method may farther comprise a memory management unit in the processing unit for supporting virtual addresses.

In another aspect of the invention, a computer program product for use with a computer includes a computer readable medium having recorded thereon a computer program or program code, the computer program is executed by a processing unit for pushing work request associated contexts into an IO device, the computer program performing the steps of: issuing a request to an IO device, fetching context data from a data storage device for an IO device; determining context of specified requests; predicting context misses of the device in the IO controller; initiating a context push; and pushing the context into the IO device using a controller when a context miss is detected to reduce the context miss latency time. In a related aspect, the step of initiating the context push includes a mechanism in an IO controller for initiating the context push, and the mechanism initiates the context push in response to information provided by the IO device.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
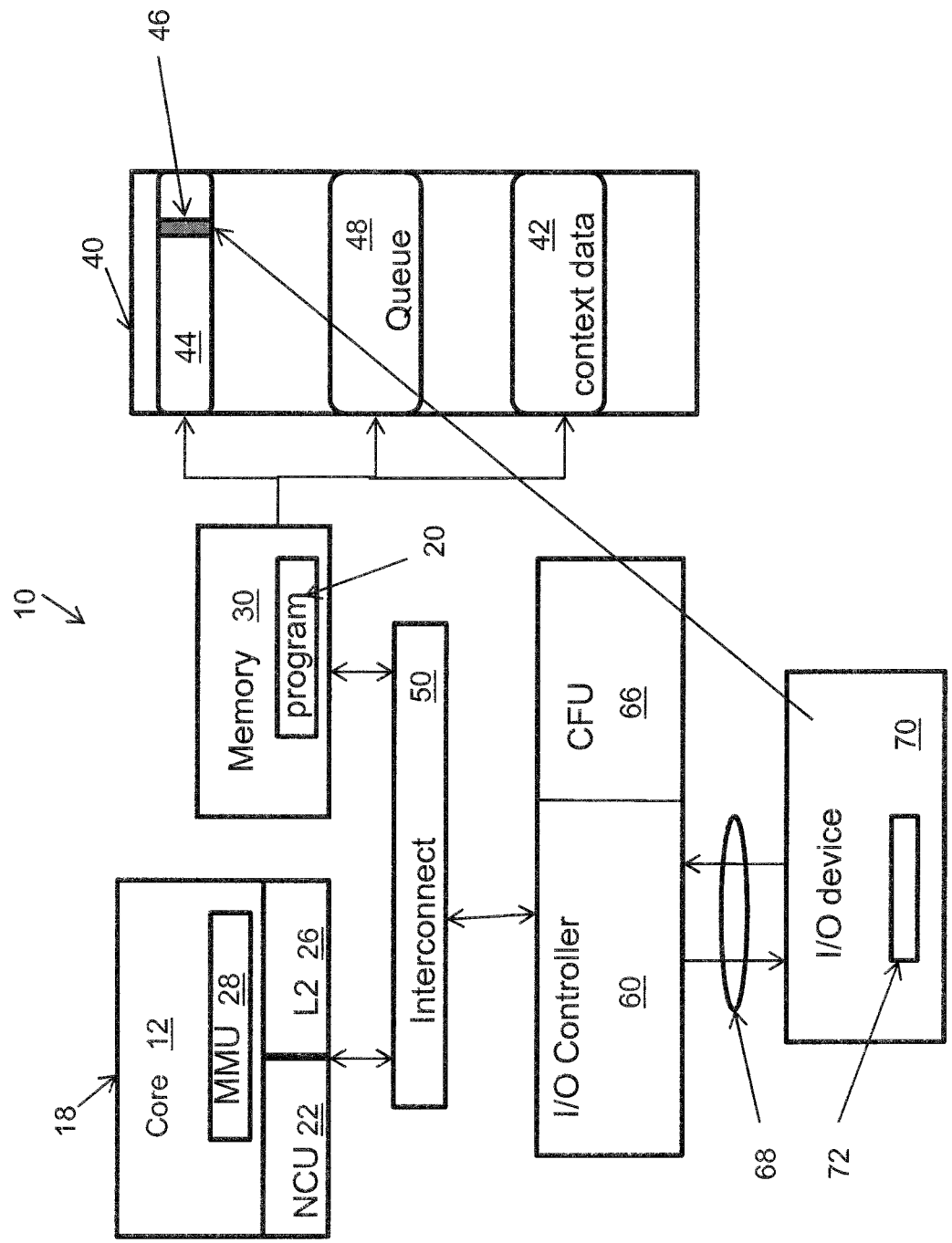
FIG. 1 is a schematic block diagram of a system according to the present invention of pushing context data in a computer system using a software virtualized context push.

Referring to FIG. 1, a method and computer system 10 for employing the method, includes a software (SW) virtualized environment where context is pushed to a device embodied as an IO device 70. The computer system 10 includes a processing unit (PU) 18 consisting of a core 12 including a memory management unit (MMU) 28, and a non-cacheable unit (NCU) 22 and a level 2 cache (L2) 26. The NCU 22 is the non-cacheable unit of the processing unit 18. The L2 is used to cache cacheable data from memory 30. The non-cacheable unit is used for data that is non-cacheable, for example, data that is destined for an IO device. IO devices are usually memory-mapped, therefore they appear in the same address space as real memory. However, the addresses they use are not memory-backed, i.e., there is no memory to eventually store the data, only the IO device can accept the data. Data that is stored in L2 26 is memory-backed. The NCU 22 is also used because the read and store transfers to IO devices need to be executed immediately and they need to be kept in order. Both the NCU 22 and L2 may use the same interconnect 50 for read and store transfers.

A program 20 is stored in a data storage device/memory 30 and runs on the processing unit 18. The program 20 uses an interface queue within the data storage space 40 consisting of a queue descriptor (QD) 44 and a queue 48 in order to issue work requests to an IO device 70. In a first step, the PU 18 checks in the queue descriptor 44 if the queue context is cached, e.g., a bit 46 may indicate when a QP is cached. Using the PU 18, a work request is posted on the queue 48. The work request/doorbell is communicated to an IO controller 60 through the interconnect 50, and the context data push is indicated in the transfer (for example, using a special bit). The context data is pushed first from the IO controller 60 if enough resources are available so that the work request store can be delayed. Then, the work request/doorbell is transferred to the IO device 70.

Continuing with FIG. 1, there are generally two paths for executing store commands (requests) in a processing unit. The normal path is through the L2 cache. Store commands to memory mapped units, and therefore also IO devices, are executed by the non-cacheable unit (NCU 22) of the processing unit 18. Those store commands have different requirements than cacheable stores, for example, they need to be kept in order and need to be executed immediately. The bus root complex/IO controller 60 (for example, a PCI root complex) is the main controller for a bus 68 which manages all connected devices and acts as the bridge between the processing unit(s) 18 and the I/O device(s) 70 accessible through the bus 68.

In operation, referring to FIG. 1, in an illustrative embodiment according to the present invention of a system 10 for pushing work request associated context data into I/O device 70. The system 10 uses software virtualization and includes a context data push initiated by a processing unit 18 included in the system 10. A user needs to check a next position for a work request using a queue descriptor 44 in order to post a work request to the queue 48. In the present embodiment of the invention, the queue descriptor 44 is implemented with a field 46 indicating if the context for the current queue is cached in the IO device cache 72. This indication may be a lazy indication, meaning that in a high load situation in the IO device 70, the caching state in the queue descriptor 44 does not need to be updated if context data is cast out. For example, the decision whether to update the indication or not may depend on the current bus-usage. After checking the queue descriptor 44, the work request is added to the queue 48. Thereafter, the work request is signaled to the IO device 70 through a data request (e.g., doorbell write) to the IO device 70 from the PU 18. The data request issued through the non-cacheable unit of the processing unit 18, is a special transfer on the processor interconnect containing an indication for the IO controller 60 that the corresponding context for the data request needs to be pushed into the IO device 70. The 10 controller 60 determines the address and size of the context data and initiates context fetch using the context fetch unit (CFU) 66. If enough resources are available in the IO device 70, i.e. back-pressure into the processing units is avoided, the data request may be delayed until the context data has arrived in the IO controller 60 and is forwarded to the IO device 70. The IO device 70 consecutively processes the work request and, when the context data for the work request is cast out from cache in the IO device 72, updates the information on the caching state 46 of the context in the queue descriptor 44. The device may also configure the context push operation in the IO controller 60 depending on the current load-situation in the IO device 70.

Figure 2:
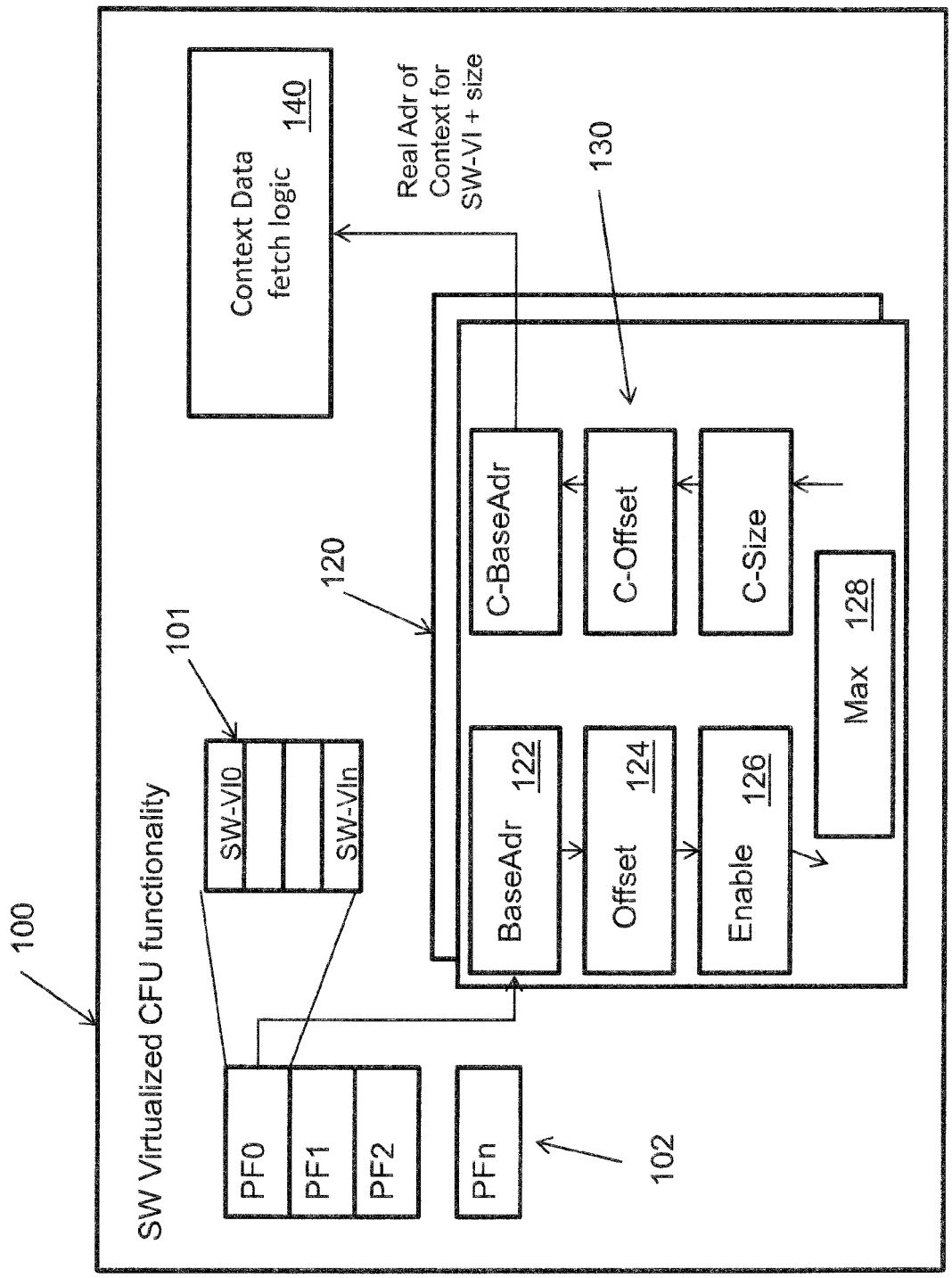
FIG. 2 is a schematic block diagram of an IO controller including virtual interface support according to the invention shown in FIG. 1.

Referring to FIG. 1 and a system 100 shown in FIG. 2, a physical function 102 of the IO device 70 is used for a multitude of virtual interfaces 101. Usually, one interface uses the address-space of one memory-page, for example a 4 kB page. In order to support a context push for SW virtualized devices in the IO controller 60 (FIG. 1), it uses a set of configuration registers 120 per physical function 102 of the IO device 70. Using a base address and virtual interface size register, the destination SW virtualized function can be determined. The set of registers comprises registers for the base address 122 (BaseAddr) of the first virtual interface, and the offset-size 124 (Offset) of the virtual interface. Furthermore, a register allows enabling/disabling 126 (Enable) of the context-push mechanism per physical function. Using the registers 120, the context number can be extracted. The SW virtualized function can be used as a pointer into the context data 42. Accordingly, the context data can be fetched using a context data fetch logic 140 and pushed into the device, e.g., I/O device 70. If the context number is smaller or equal to a value defined in another register 128 (Max), the real address and size of the context to be fetched is calculated. This calculation is done using the registers C-BaseAddr, C-Offset and C-Size, collectively referred to as registers 130. Alternatively, as an extension, multiple registers (e.g., BaseAdr registers) may be provided. For SW-virtualized devices there may be three virtual interfaces with the same structure exported which start on different base addresses, one for the user, one for the supervisor and one for the hypervisor. This mechanism allows the device to restrict the access to some of the virtual interface-registers to users of a specified level.

Figure 3:
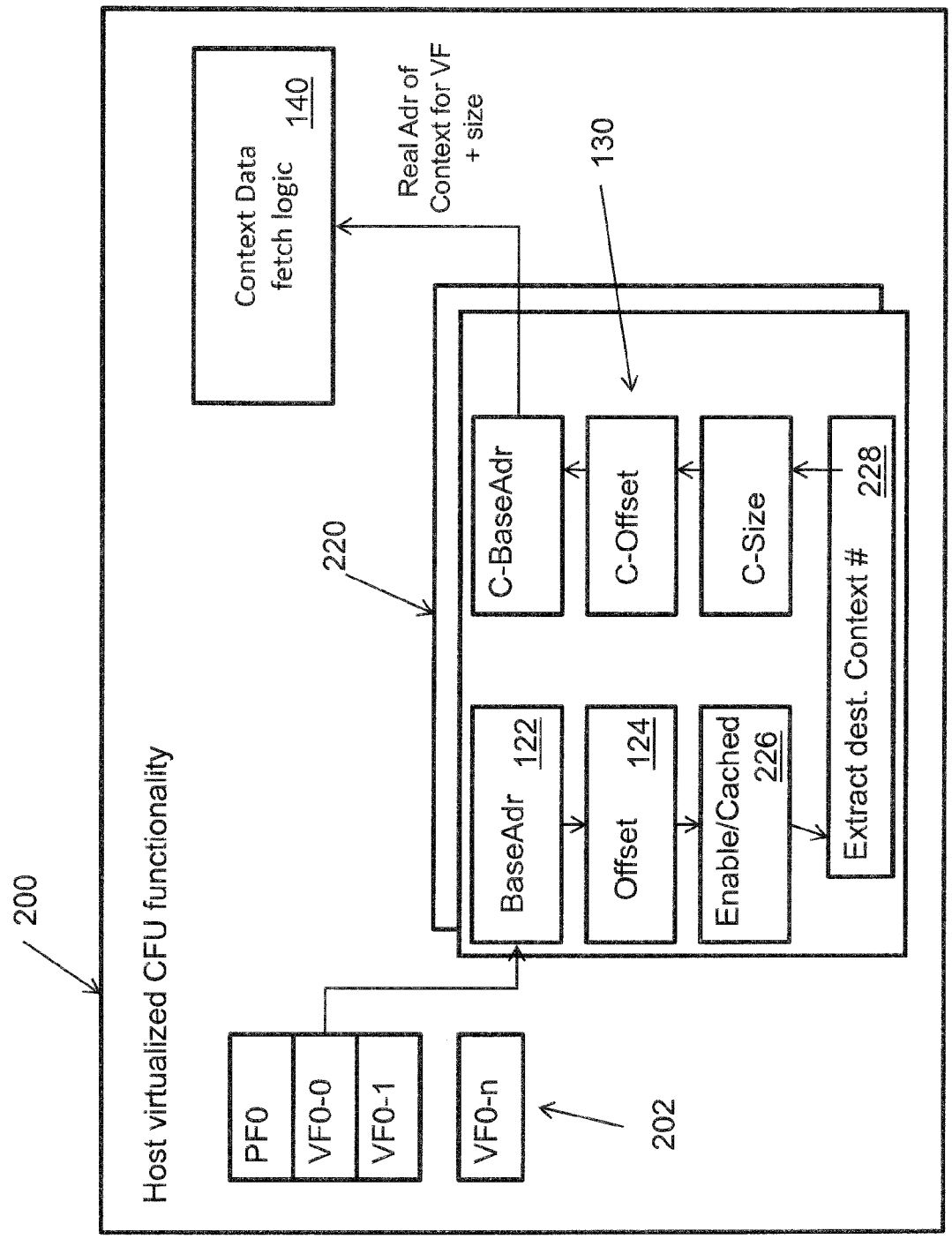
FIG. 3 is a schematic block diagram of another embodiment of a system according to the present invention having virtual interfaces using a hardware virtualized context push.

In another embodiment of the present invention, a hardware-based host-virtualized system shown in FIG. 3 is similar to the system 100 shown in FIG. 2 wherein the mechanisms in the context fetch unit 66 (FIG. 1) are the same as in the SW virtualized embodiment (shown in FIG. 2). The host virtualized system does not need a caching state 46 (FIG. 1) if every virtual function is used for one virtual interface only. Further, in this host virtualized system with a one-to-one mapping, there is no interaction needed between the processing unit 18 and the IO controller 60 (shown in FIG. 1). Instead, the state of the context data within the device is stored in the CFU 66 (FIG. 1). Therefore, the processing unit 18 issues a normal request through the NCU 22 to the IO controller 60. The IO controller 60 checks if a request necessitates context data in the IO device 70, then checks in its internal registers if the context is cached and, if necessary, initiates the context push. As in the system shown in FIGS. 1 and 2, the PU 18 request may be delayed until the context is written into the IO device 70. The IO device 70 updates the information on the caching state of its context and thus enables/disables context pushes in the CFU 66.

Referring to FIG. 3, in an alternative embodiment of a system 200 according to the invention, a host-virtualized context push flow does not require the caching indication 46 shown in FIG. 1. In the system 200, the same reference numerals are used for like elements of system 100 shown in FIG. 2. The system 200, includes determining registers necessary to implement the hardware-support for a host virtualized IO system using virtual functions, which may be the same as used for the SW virtualized system 100 shown in FIG. 2. If the system 200 supports only one context per virtual function, the offset-registers are not necessary. However, providing those registers as well allows using one virtual function also for a number of multiple virtual interfaces. Typically, wherein one virtual function 202 maps exactly one context in the device, an enable indication 226 in the register set 220 can be used as a mechanism for representing the caching state of the context within the device 200. If the context is cached, the mechanism is disabled, if it is not cached, the mechanism is enabled. Enabling/Disabling the mechanism is controlled by the IO device 70.

In an alternative embodiment of using cache information, the indication of the caching state of a context used in a SW-virtualized device may also be used to better distribute work requests when using a split approach of on and off loading for work request processing. For example, if the context data is cached in the device, the processing unit can forward the request to the IO device. Alternatively, if the context is not cached and the device is busy on other work, for example, signaled through an answer to the store-request from the PU to the IO controller, a dedicated processing unit may be used for packet processing. Combining the routing with cache injection, contexts which are cast out from the device cache may be injected into the cache of the processing unit dedicated to packet processing.

The advantages of the system and method of the present invention include allowing the processor unit complex to push data-associated contexts into a virtualized IO device. Further, the method facilitates work request handling in the device by reducing/avoiding context misses. Reduction of context misses helps in reducing the latency increase of the processing caused by context cache misses. Furthermore, reduction of context misses allows better ordering of the data transfers when enough resources are available in the IO controller. Thus, context misses can be avoided because the context is fetched before the request is issued to the device and possibly the push of the payload data.

Thus, the method of the present invention uses knowledge about the state of each context, that is, if it is cached in the device or not, in order to be able to make an early intervention in the IO controller and push the context into the device, if possible even before sending the work request. Therefore, the number of context-misses can be reduced significantly allowing for higher performance of the IO device.

Thus, the system and method of the present invention predicts context-misses within a processing unit or the IO controller. On detection of the context-miss, the IO controller intervenes and tries to push the context into the IO device in order to reduce the context-miss latency impact. Two different mechanisms can be used with the same hardware resources in the IO controller. For software virtualization, SW/HW (hardware) interaction with hardware support in the PUs and the IO controller is proposed for initiating the context-push in the IO controller. For hardware-virtualized systems using single or multi root virtualization, the same mechanisms as for the SW virtualization approach can be applied within the IO controller without necessity of further PU-support.

For either SW or HW virtualization, the regular structure of the contexts that usually matches the doorbell (request) structure, knowing the size of the virtual interface of one user and the base address for the virtual interfaces, the doorbell and/or other requests to a device can be used to determine its context. Knowing the context needed for the current request, the context can be fetched from memory using the base address of the contexts, the size of a context and the context number recently derived.

The method described herein includes an IO device using main memory for its context data. Comparing current hardware and software virtualization mechanisms, the present invention's software virtualization using supervisors or hypervisors is less expensive than providing extensive hardware virtualization support, and also scales better than hardware virtualization.

Both the virtual interface as well as the context storage of the present invention use regular constructs to resolve context-misses as fast as possible. It is therefore easier to determine the required context. Prediction and early resolution of context misses can considerably reduce the latency impact. Latency for context-oriented processing in IO devices can therefore be improved through improved IO device, software, and IO controller interaction. The present invention also facilitates operation in the IO device by sufficiently delaying a doorbell until the context-miss is resolved.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method for pushing work request associated contexts into an IO device using a computer system including computer readable medium having a program recorded thereon and being executable by a processing unit, comprising:
   issuing a request to an IO device, the IO device communicating with a context fetch unit (CFU) and an IO controller;
   determining context of specified requests;
   fetching context data from a data storage device/memory for the IO device, fetching the context data includes determining an address and a size of the context data stored on a data storage device;
   predicting a context miss of the IO device based on the state of the context data including when the context data is cached in the IO device;
   initiating a context data push of the missed context data; and
   pushing the context data which was missed into the IO device using the IO controller when the context data miss is detected to reduce the context data miss latency time.

2. The method of claim 1, wherein the initiating the context data push includes a software program embodied on computer readable medium interacting with the device for initiating the context push.

3. The method of claim 1, wherein the step of initiating the context data push includes a mechanism in the IO controller for initiating the context data push, and the mechanism initiates the context data push in response to information provided by the IO device.

4. The method of claim 1, wherein fetching the context data includes using a base address of the context data.

5. The method of claim 1, wherein fetching the context data includes a recently derived context number.

6. The method of claim 1, wherein the controller is an IO controller interfacing with a virtual device.

7. The method of claim 6, further including:
   determining a page size of a virtual interface.

8. The method of claim 1, further including:
   determining a base address for virtual interfaces of the device; and
   determining the context data of the request using the base address.

9. The method of claim 1, further comprising:
   presenting a plurality of IO interfaces to a user of virtual functions or virtual interfaces.

10. The method of claim 1, further comprising:
    providing a memory management unit supporting virtual addresses.

11. The method of claim 1, wherein a memory management unit is used to map at least one interface into a virtual address space of at least one user, the device being an IO device, and the IO device providing at least one virtual function in an IO controller.

12. The method of claim 11, wherein the IO device presents a plurality of interfaces to a user of a virtual function.

13. A system for pushing work request associated contexts into an IO device, comprising:
    a computer system including computer readable medium having a program recorded thereon and being executable by a processing unit in the computer system;
    an IO device for receiving a request from the processing unit;
    a data storage device/memory being configured to store context data for fetching by the IO device, the IO device being configured to determine an address and a size of the context data stored on a data storage device;
    a memory device in the computer system providing context data for an IO device, the computer system being configured to determine context of specified requests and predicting context misses of the IO device based on the state of the context data including when the context data is cached in the IO device, the processing unit of the computer system initiating a context data push of the missed context data; and
    an IO controller used by the computer system for pushing the context data into the IO device when a context data miss is detected to reduce the context data miss latency time.

14. The system of claim 13, wherein a mechanism in an IO controller initiates the context push, and the mechanism initiates the context push in response to information provided by the IO device.

15. The system of claim 14, further comprising:
    a memory management unit communicating with the processing unit supporting virtual addresses.

16. A computer program product for use with a computer, the computer program product including a non-transitory computer readable medium having recorded thereon a computer program or program code, the computer program being executed by a processing unit for pushing work request associated contexts into an IO device, the computer program performing the steps of:
    issuing a request to an IO device, the IO device communicating with a context fetch unit (CFU) and an IO controller;
    determining context of specified requests;
    fetching context data from a data storage device for the IO device, wherein fetching context data includes determining an address and a size of the context data stored on a data storage device;
    predicting a context data miss of the IO device based on the state of the context data including when the context data is cached in the IO device;

initiating a context data push of the missed context data; and pushing the context data which was missed into the IO device using a controller when the context data miss is detected to reduce the context data miss latency time.

17. The product of claim 16, wherein the step of initiating the context push includes a mechanism in an IO controller for initiating the context push, and the mechanism initiates the context push in response to information provided by the IO device.

18. The system of claim 13, wherein a mechanism is used to push the context into the IO device, the mechanism includes the processing unit and the IO controller, or the mechanism includes only the IO controller.

* * * * *